E. L. MILLER.
AUTOMATIC GEAR SHIFT FOR AUTOMOBILES.
APPLICATION FILED AUG. 19, 1916.
1,244,629.
Patented Oct. 30, 1917.
5 SHEETS—SHEET 5.
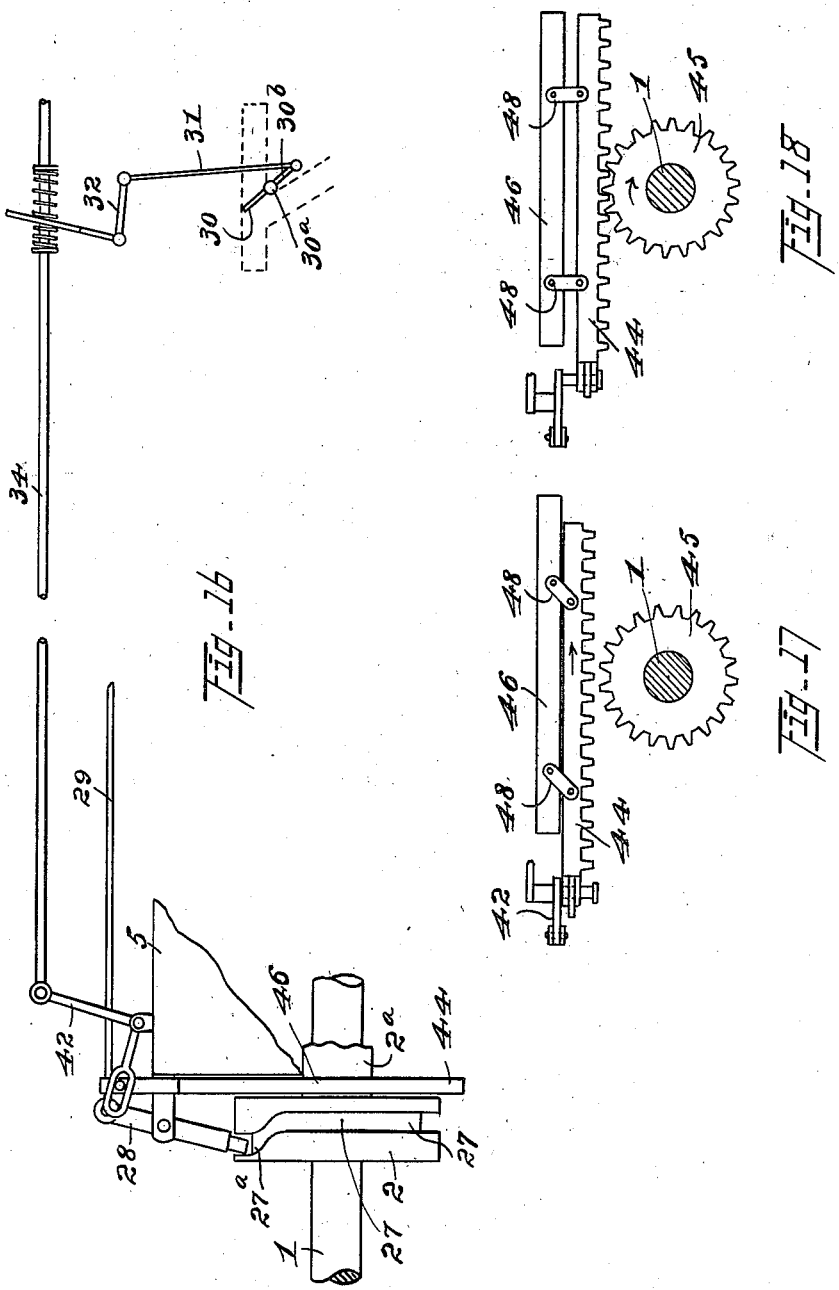

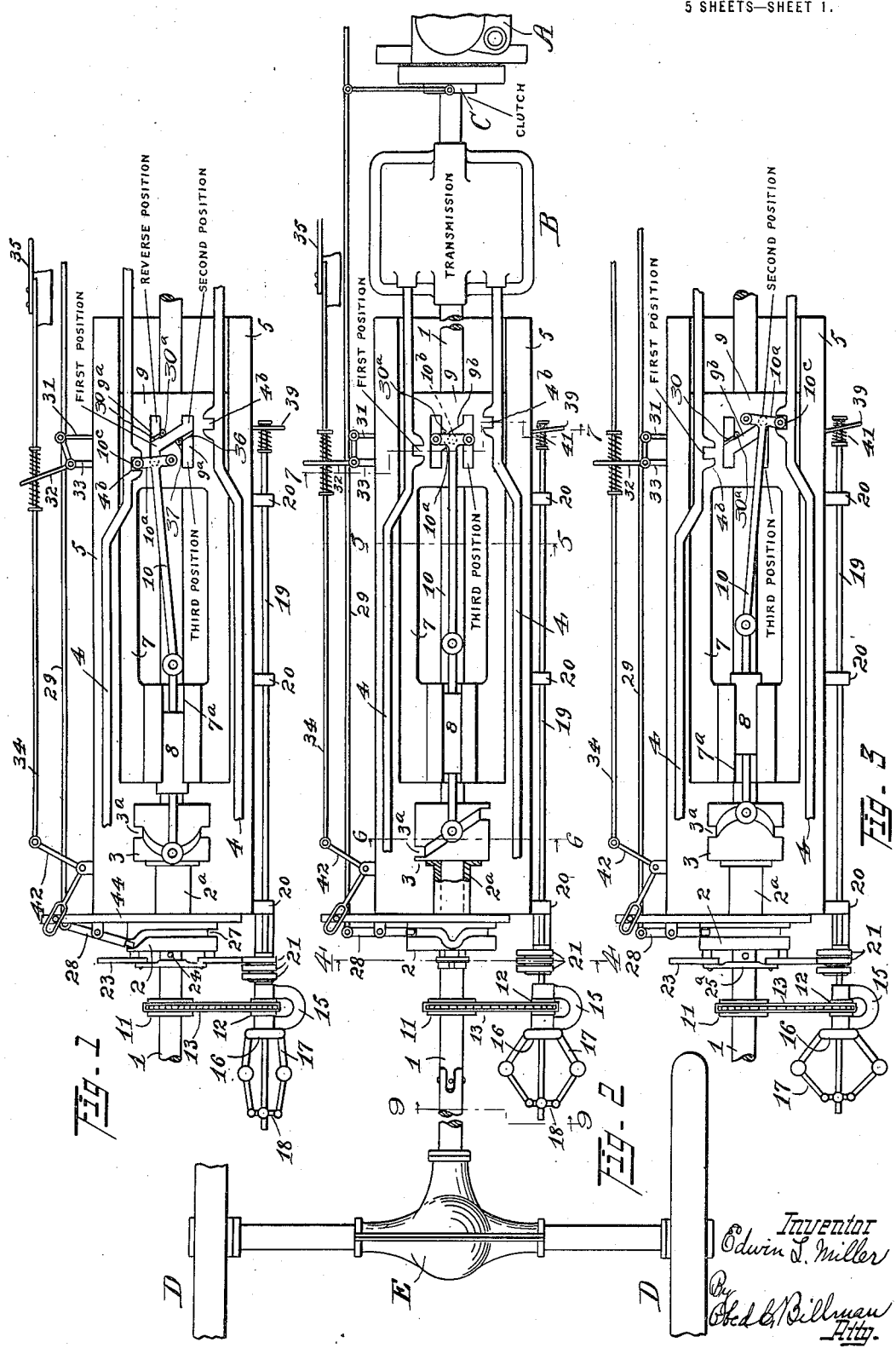

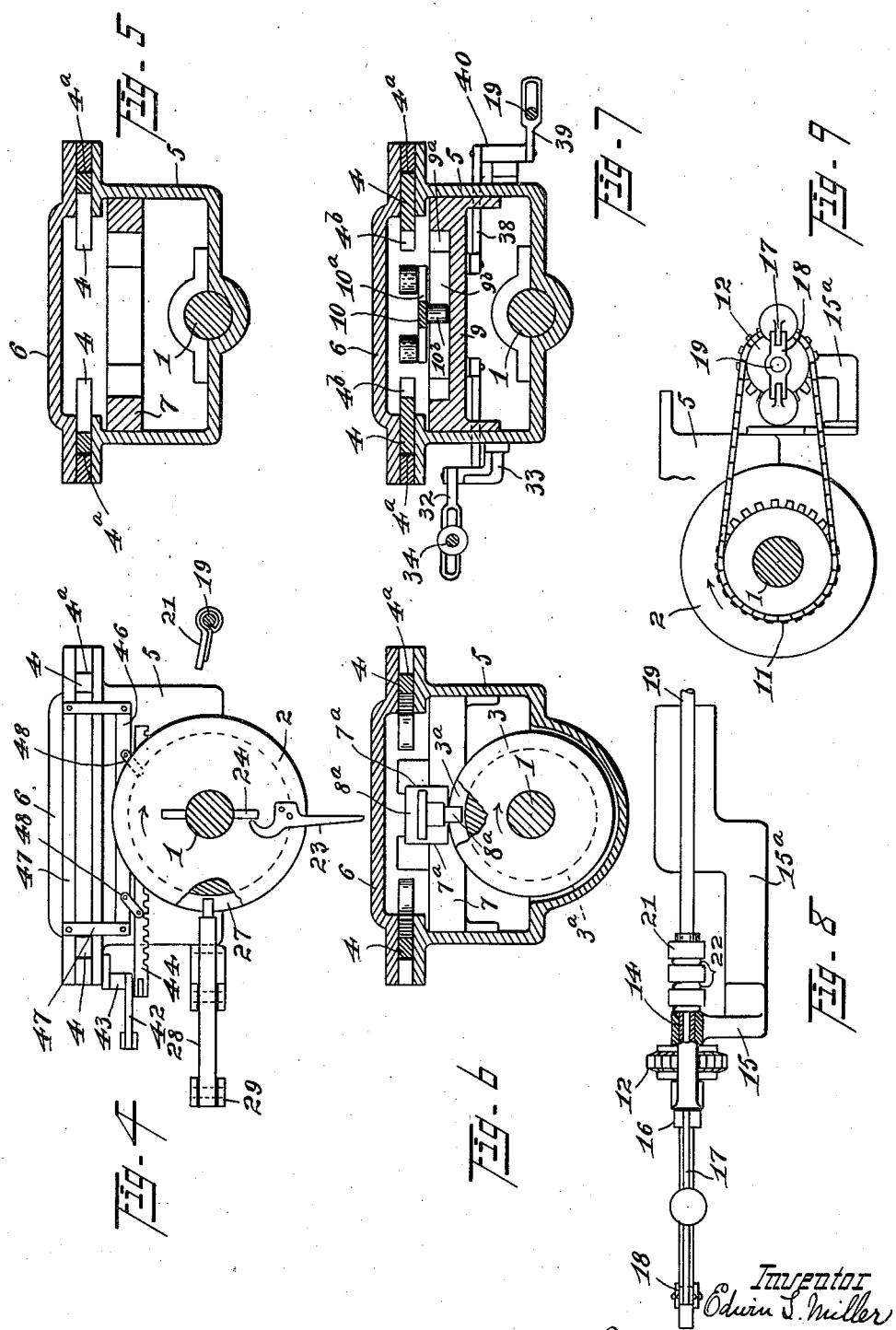

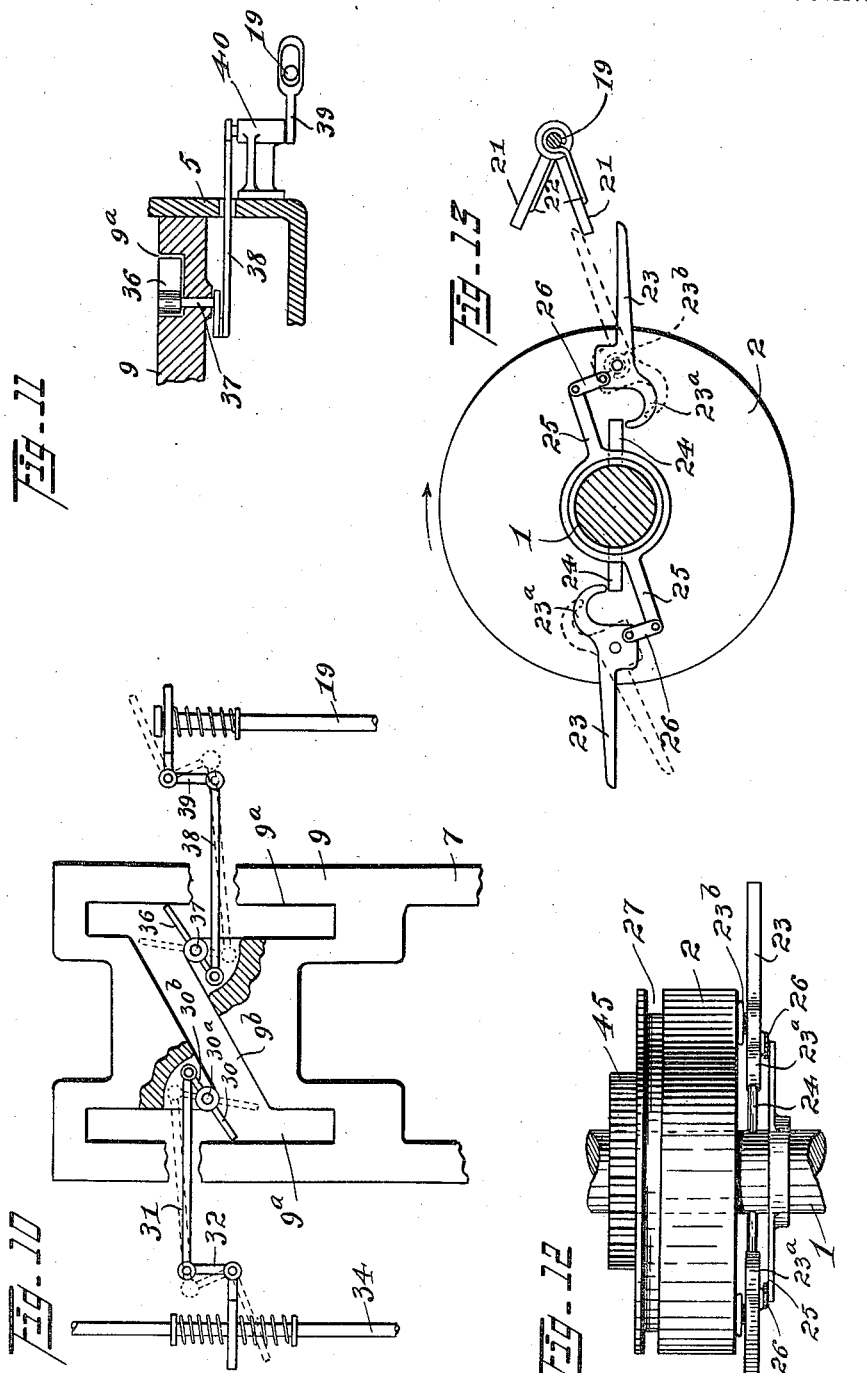

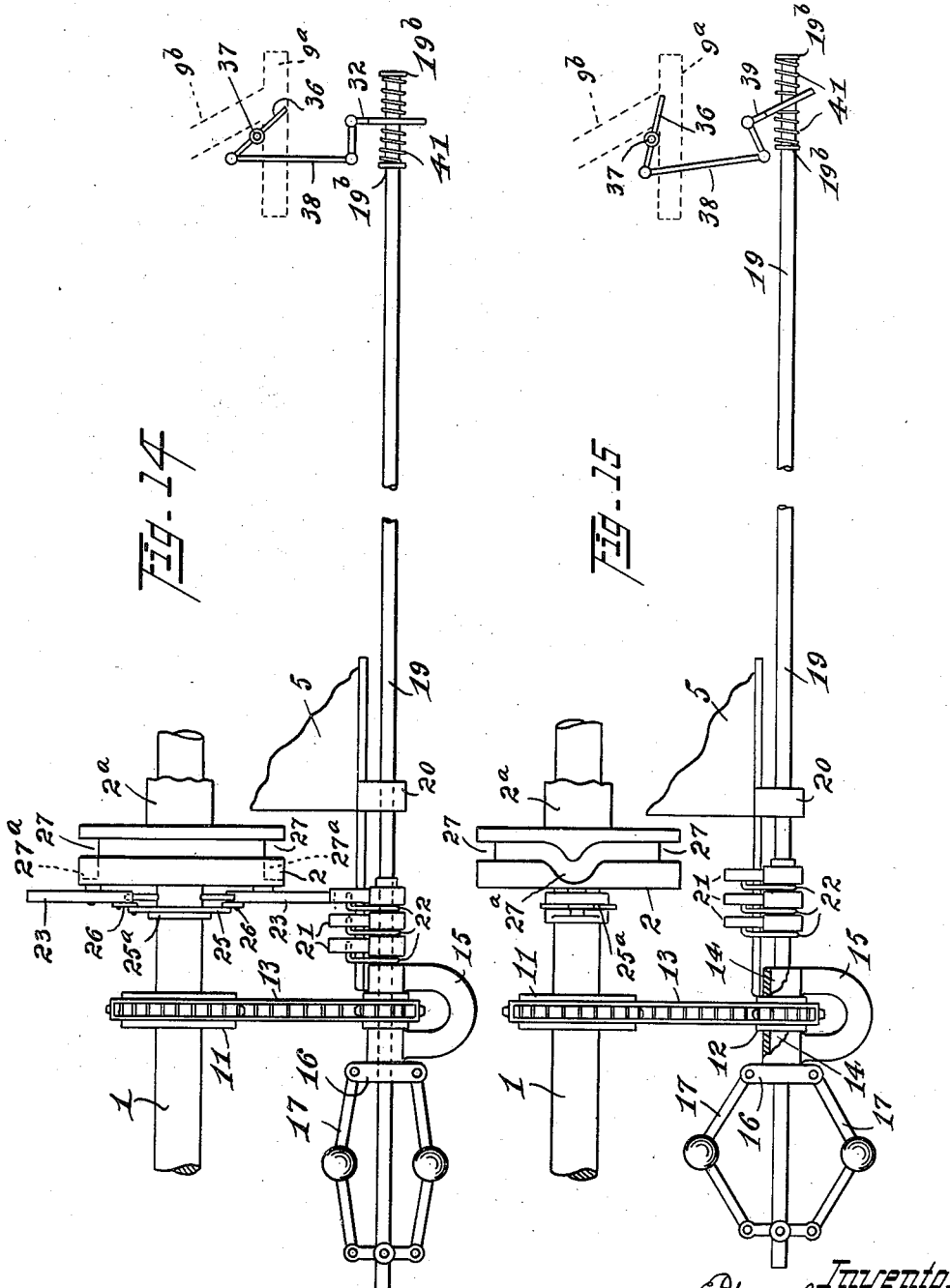

UNITED STATES PATENT OFFICE.

EDWIN L. MILLER, OF MILLERSBURG, OHIO.

AUTOMATIC GEAR-SHIFT FOR AUTOMOBILES.

1,244,629.  Specification of Letters Patent.  Patented Oct. 30, 1917.

Application filed August 19, 1916. Serial No. 115,772.

*To all whom it may concern:*

Be it known that I, EDWIN L. MILLER, a citizen of the United States, residing at Millersburg, in the county of Holmes and State of Ohio, have invented certain new and useful Improvements in Automatic Gear-Shifts for Automobiles, of which the following is a specification.

My invention relates to improvements in automatic gear shifts for motor vehicles, such as automobiles, motor trucks, and the like, the invention being particularly designed and adapted for use in connection with any standard or conventional form of change or variable speed gearing or transmission for such vehicles, the primary object of the invention being to provide simple and efficient automatic gear shift mechanism which will give the proper relative speeds between the engine or motor driving shaft, and the driving or traction wheels of the vehicle under all conditions of operation and without any attention from the driver or chauffeur.

Heretofore it has been proposed to control the speed changing gear between the engine and the driving or traction wheels of the vehicle by an automatic device, such as a centrifugal governor, responsive to variations in the speed of the engine, but such an arrangement is not suited to all conditions of service, and especially in connection with internal combustion engines, since such engines give their maximum output at high speed, and, consequently, on steep grades or bad roads, where a large amount of power is required, it is highly desirable and often necessary to run the engine at high speed, which cannot be attained through the medium of such automatic devices connected and arranged as referred to.

In carrying out my invention, I therefore connect the automatic controlling device to the driving or traction wheels, through some suitable point of connection in the present instance, to the driving or connecting shaft leading from the transmission or change gear mechanism to the differential gearing of the rear axle, instead of to the engine or other driving shaft running at substantially the same speed as the engine, whereby the change speed gears are controlled according to the speed of the driving wheels or vehicle, so that in running on a good level road, the gears are actuated so as to increase gradually the speed of the vehicle up to the maximum, while on striking a grade or a bad road, which slows down or increases the resistance to the speed of the vehicle, the high speed gears are thrown out, and the low speed gears thrown in successively, so as to permit the engine to operate at high speed with maximum output, and to drive the vehicle through the low speed gear, the parts being so arranged that when the vehicle is started the clutch will be first released, after which the low speed gear will be automatically thrown in.

With the above mentioned and other ends in view, the invention consists in the novel construction, arrangement, and combination of parts hereinafter described, illustrated in one of its embodiments in the accompanying drawings, and particularly pointed out in the appended claims.

Referring to the drawings, forming a part of this specification, Figure 1 is a top plan view of the improved gear shift or automatic speed control mechanism, the parts being shown in their first or initial position preparatory to moving the gear shift or slide to its first or low speed position, and preparatory to the initial automatic release of the clutch, the clutch being released before and during the movement of the shifts or gears, to first intermediate and high speed positions, respectively.

Fig. 2, a similar view, the first gear shifter bar having been moved to first position and the pitman being in its intermediate position, after leaving the first shifter bar and passing through the intermediate portion of the H-shaped shifter guide to engage the second shifter bar preparatory to moving the latter to second position.

Fig. 3, a similar view, showing the second shifter bar engaged by and moved to the second or intermediate speed position of the gears.

Fig. 4, an enlarged end view, partly in section, taken on line 4,—4 of Fig. 2.

Fig. 5, an enlarged cross sectional view on line 5,—5 of Fig. 2.

Fig. 6, an enlarged cross sectional view taken on line 6,—6 of Fig. 2.

Fig. 7, an enlarged cross sectional view taken on line 7,—7 of Fig. 2.

Fig. 8, an enlarged side elevation of the governor mechanism and supporting brackets thereof.

Fig. 9, an enlarged end elevation taken on line 9,—9 of Fig. 2.

Fig. 10, an enlarged top view of the H-shaped shift pitman shifter guide, certain parts being broken away for the purpose of clearly illustrating the gate and gate actuating mechanism.

Fig. 11, an enlarged cross section view through one side of the H-shaped shifter guide and casing showing the crank and link actuating mechanism for one of the gates.

Fig. 12, an enlarged detailed view of the intermittently actuating wheel or disk together with the driving shaft actuating mechanism carried thereby.

Fig. 13, an end view of the same, showing the oppositely arranged tripper arms engaged and carried by the cross pin or projections of the driving shaft, the dotted lines showing the manner in which the tripper arms are held in position by the spring resisted tripper members on the governor shaft to permit the driving shaft to turn until the governor shaft has been moved longitudinally far enough to release the engaged tripper arm to permit a half revolution of the wheel or disk.

Fig. 14, an enlarged detailed view of the intermittently operating tripper arm carrying disk, and governor mechanism coöperating therewith, the governor mechanism being in unshifted position.

Fig. 15, a similar view, the governor mechanism having moved the governor shaft to its extreme inner position to close the gate on the adjacent side of the H-shaped shifter guide whereby to move the adjacent gear shifter bar to its extreme reversed position for carrying the gears to the third or high speed position.

Fig. 16, a detailed top plan view of the intermittently operated tripper arm carrying disk, the tripper arms being removed and the clutch release lever being in its normal or unshifted position preparatory to the movement of the disk.

Fig. 17, an enlarged detailed view of the rack and pinion mechanism in its initial position for manually operating or giving the arm carrying disk a half turn or revolution to the right and at the same time close the gate in the H-shaped shifter guide for causing the first or adjacent shifter bar to be moved to its extreme or "gear reverse" position.

Fig. 18; a view showing the rack arm in engagement with the pinion portion of the arm carrying disk for manually giving the latter a half revolution in the reversing operation.

Similar numerals of reference designate like parts throughout all the figures of the drawings.

In carrying out this invention, the improved mechanism is preferably attached to the driving or connected shaft 1, between the transmission or change speed gears and the differential gears of the rear axle connected to the drive or traction wheels of the vehicle, so that the shaft or other point of connection will not vary in speed with the speed of the traction wheels or vehicle:

The driving or connecting shaft 1, is provided with an arm carrying disk or wheel 2, the latter being loosely mounted on the shaft 1, by means of a bearing sleeve $2^a$, said sleeve $2^a$ terminating in a cam or slide actuating head 3. The cam or actuating head 3 is provided with a cam or actuating groove $3^a$, the groove $3^a$ being so shaped and extending on opposite sides of the head $3^a$ that each half revolution of the latter will result in one complete stroke or reciprocation of the slide and its attached mechanism as hereinafter described.

The transmission mechanism or change speed shifting gears may be of any suitable and convenient construction and, in the present instance, is operated through the medium of two shifter bars or slides 4, the latter being suitably connected to the shifting gears or transmission mechanism, and being mounted, in the present instance, in slideways 4, of a suitable casing 5, and cover 6, said cover 6, being shown in Figs. 4 to 7, inclusive, of the drawings and being omitted in Figs. 1 to 3 of the drawings, in the latter instance, for the purpose of clear illustration of the parts.

The shifter bars or slides 4, are provided on their inner sides with notches or recesses $4^b$ extending toward each other and as a means of actuating the shifter bars 4, to proper positions and in proper relation to each other in accordance with the speed of the vehicle and various resistances met by the latter, the casing 5, is provided with a guide or bearing plate 7, the latter, in the present instance, terminating at one end in a guide way $7^a$, to receive and contain a reciprocatory slide 8, and at the other end forming a substantially H-shaped guide way comprising the longitudinally extending side guide members $9^a$, and the inclined intermediate guide member $9^b$, said H-shaped guide members $9^a$ and $9^b$ acting, in conjunction with the gate members or valves hereinafter described, to properly guide and reciprocate the free end of the pitman 10, through the medium of the depending projection or roller $10^b$, on the cross head $10^a$. The cross head $10^a$ is preferably provided at its opposite ends with anti-friction rollers $10^c$, adapted to pass into and out of as well as to temporarily engage with the notches $4^b$, of the shifter bars or slides 4, as the latter are moved through the action of the pitman 10, connected to the slide 8, the latter being provided with a depending projection $8^a$, extending into and traveling in the actuating groove $3^a$, of the slide actuating head 3.

It will be seen that the groove $3^a$ of the head 3, is so arranged that every half revolution of the latter when operated through the governor and actuating mechanism hereinafter described in accordance with the speed given to the shaft 1, will give the slide 8, one complete throw or impulse, and as a means of causing the arm carrying disk to be intermittently given a half turn in accordance with the speed of the shaft 1, the latter is provided with a sprocket wheel 11, communicating with a second sprocket wheel 12, through the medium of a sprocket chain 13, the sprocket wheel 12, being mounted on a rotatably mounted sleeve 14, said sleeve 14, being mounted in a bracket 15, of a main bracket 15$^a$, (see Figs. 8 and 9) and the sleeve 14, terminates in a cross head 16, carrying a pair of governor arms or links 17. The governor arms or links 17, may be of any suitable and convenient construction and are connected at their outer ends to a second cross head or member 18, which latter is connected to a longitudinally movable governor shaft 19. The governor shaft is adapted to reciprocate in the bracket 15, and the brackets 20, carried at the side of the casing 5, and as a means of intermittently stopping the tripper arms of the arm carrying disk 2, at the end of each half revolution and holding the same in such position until the speed of the shaft 1, has been changed sufficiently to shift the governor shaft 19, at a predetermined speed of the shaft 1, the governor shaft 19, is provided with a plurality or series of spring resisted tripper arms 21, the latter having a limited circumferential movement on the shaft 19, and against the resistance of springs 22, as indicated most clearly in Fig. 13, of the drawings, the governor tripper arms 21, normally extending in the upper full line position indicated in Fig. 13, and the particular tripper arm 21, which sustains the tripper arm of the disk 2, being held in the depressed position indicated until the governor has moved the governor shaft 19, longitudinally a sufficient distance to permit the engaged tripper arm 21, to pass off at one side whereupon the tripper arms 23, on the disk 2, will be thrown into engagement with the oppositely arranged projections or pins 24, of the shaft 1, to permit the latter to carry the disk 2, a half revolution or until the opposite arm is again engaged and stopped by one of the tripper arms 21, on the governor shaft 19.

The inner ends of the tripper arms 23, are provided with hooked portions 23$^a$, adapted to be engaged by the projections 24, on the shaft 1, while the latter is carrying the disk a half revolution, and as a means of simultaneously actuating the arms 23, in proper relation to each other said arms are connected by means of a connecting arm 25, having a sleeve portion 25$^a$, adapted to rock upon the shaft 1, the ends of said arm 25, being connected to the inner portions of the arms 23, by means of links 26, and as a means of holding the arms 23, into engagement with the projections 24, while the disk 2, is making a half revolution one of the arms 23, may be resisted by means of a spring 23$^b$.

As a means of disengaging or releasing the clutch between the engine shaft and the first driving shaft leading into the transmission before any substantial movement is imparted to the shift bars for shifting the gears as well as holding such clutch open while the gears are being shifted during the half revolution of the disk 2, the latter is provided with a circumferential groove 27, in its outer periphery, said groove being provided on diametrically opposite sides of the disk with outwardly extending loops 27$^a$, the latter being adapted normally to receive and contain the end of a lever 28, so that upon the initial movement of the disk 2, the lever 28, will be moved from the position shown in Figs. 1 and 16, to the position indicated in Figs. 2 and 3 of the drawings, thereby releasing the clutch through the medium of the connected rod or link 29. After the initial movement of the lever 28, it will be held in its clutch releasing position as indicated in Figs. 2 and 3 of the drawings by being caused to traverse the circumferential groove 27, until the disk 2, has been moved a half revolution, whereupon it will return to its original position to throw the clutch in by the action of the adjacent loop 27$^a$, as hereinbefore described.

As a means of causing the depending projection or roller 10$^b$ to be diverted from the first side guide member 9$^a$, to the intermediate guide member 9$^b$, after the pitman has moved the first shifter bar 4, to the first position of the gears as indicated in Fig. 2, of the drawings, and to cause such pitman to leave the first shifter bar and pass over to engage the second shifter bar as indicated in Figs. 2 and 3 of the drawings, a gate or valve 30, is pivotally mounted in the intersecting portions of the guide grooves 9$^a$ and 9$^b$, said gate 30, swinging on the vertically extending shaft 30$^a$, said shaft being operated by means of an arm 30$^b$, the latter being connected to a link 31, and the latter being connected to a crank arm 32, the crank arm being mounted in a suitable bracket 33, one of the arms of the crank 32, being slotted to receive and be operated by a rod 34, extending forwardly and being adapted to be manually operated by means of a lever 35, for the manual operation of the gate 30, and the manual throwing of the disk 2, moving the first shifter bar to its extreme or opposite position in the reversal of the gears by the mechanism hereinafter fully described.

Upon reference to Fig. 2 of the drawings it will be seen that the cross head has left the first shifter bar after moving the latter to its first position, and as the slide actuating head 3, is moving the depending projection 10$^b$, is traversing the inclined intermediate guide groove 9$^b$, preparatory to engaging the adjacent notch or recess 4$^b$, of the opposite or second shifter bar and moving the latter to a position to shift the gears to what is known as the second position or "intermediate" speed.

As a means of causing the second shifter bar to be moved in an opposite direction or to its extreme opposite or third position corresponding to "high speed" upon a sufficiently rapid rotation of the shaft 1, and the governor mechanism connected therewith, or in other words, carrying the second shifter bar from second to third position, the governor shaft 19, is connected to a gate 36, acting to close the intersecting portions of the intermediate guide groove 9$^b$, and adjacent side groove 9$^a$, as illustrated in Fig. 10 of the drawings whereby the depending portion 10$^b$ of the pitman will be caused to traverse the entire length of the side groove 9$^a$, and move the second shifter bar to the third position indicated on the H-shaped shifter guide shown in Figs. 1, 2, and 3, of the drawings. The gate 36, is mounted on a shaft 37, (see Fig. 11), the shaft 37, being provided with an arm 37$^a$, being connected to a link 38, leading to a crank lever 39, the crank lever 39, being mounted in the bracket 40, and the lever 39, being provided with a slot to receive and contain the governor shaft 19, and being operated from the latter through the medium of cushioning springs 41, said springs bearing against suitable collars 19$^b$, on the governor shaft 19.

As a means of reversing the vehicle when the latter has been brought to low speed, or to a stop, or in other words,—of causing the cross head of the pitman 10, to engage the first bar and carry the latter to its extreme reverse position traversing the first side guide 9$^a$, to what is known as "reverse position," the rod 34, controlled by the lever 35, is connected to a bell crank 42, said bell crank being connected to a rack 44, adapted to come into contact with the pinion 45, of the disk 2, (see Figs. 17 and 18), whereby the disk 2, may be given a half revolution, the initial movement of the rod 34, acting to close the intersecting portion of the intermediate guide 9$^b$, as indicated by dotted lines in Fig. 10, in the drawings whereby the depending portion 10$^b$, of the pitman will be carried the entire length of the side guide 9$^a$, and thereby carry the first shifter bar to its extreme or gear reversing position.

As a means of normally holding the rack 44, out of engagement with the pinion 45, when the arm carrying disk 2, is being automatically operated in accordance with the speed of the vehicle as hereinbefore described the rack 44, is mounted on a cross bar 46, carried upon a friction resisted carriage 47, the latter being slidably mounted at the rear of the casing 5, as shown most clearly in Fig. 4 of the drawings. The rack 44, being secured to the cross bar 46, of the carriage 47, by means of the reciprocatory links 48, it will be seen that when the rack is given its initial movement it will be first depressed into engagement with the pinion 45, as indicated in Fig. 18, of the drawings after which a further movement will move the pinion 45, and the disk 2, carried thereby a half revolution thereby moving the pitman and first shifter bar to its extreme or "reversed position" as hereinbefore explained.

In Fig. 2 of the drawings, I have illustrated somewhat diagrammatically one method of mounting and connecting my speed-responsive device to a self-propelled vehicle embodying a prime mover A, such as an internal combustion engine, or the like, operatively connected to suitable transmission mechanism B, through the medium of a suitable clutch C, the speed responsive device being mechanically connected to the driving or traction wheels D, of the vehicle, in the present instance, to the driving or connecting shaft 1, leading from the transmission mechanism to the rear axle through the medium of the differential gears E.

From the foregoing description, taken in connection with the accompanying drawings, the operation and advantages of my invention will be readily understood.

Having thus described one of the embodiments of my invention, what I claim and desire to secure by Letters Patent, is—

1. In an automobile, speed-responsive governor controlled mechanism including gear shifter bars, a shifter bar actuating pitman in coöperative relation thereto, and pitman guiding and controlling mechanism in coöperative relation to said first mentioned mechanism.

2. In an automobile, a prime mover, a traction wheel propelling shaft, speed-responsive clutch and gear shifting mechanism connected therewith, said gear shifting mechanism including a pitman and governor controlled pitman shifting and controlling mechanism, and means for manually controlling and operating said speed-responsive mechanism for reversing said propelling shaft.

3. In an automobile, a prime mover, speed-responsive mechanism, speed-changing gearing, shifter bars for the latter, a pitman arranged between and adapted to alternately shift said bars and connected to and reciprocated by said speed-responsive mechanism, and governor and pitman shifter guide control mechanism in coöperative relation to said speed-responsive mechanism.

4. In an automobile, speed-responsive mechanism comprising intermittently operated gear shifting and clutch shifting mechanism, and governor mechanism connected to and automatically controlling the latter in accordance with the speed of the same, said gear shifting mechanism including a governor controlled rotatable clutch and gear shifting member and guide and gate mechanism controlled by said governor mechanism.

5. In an automobile, a traction wheel propelling shaft, clutch and gear shifting mechanism connected therewith, said gear shifter mechanism including a reciprocating pitman and pitman shifting mechanism, and governor mechanism for intermittently operating said gear and pitman shifting mechanism in accordance with the speed of said shaft.

6. In an automobile, a driving or traction wheel propelling shaft, governor-controlled clutch and gear shifting mechanism connected therewith, said mechanism including a pitman and pitman controlling means, and means for automatically operating said clutch and gear shifting mechanism by said governor-controlled mechanism at predetermined speeds of the latter.

7. In an automobile, a prime mover, speed-responsive gear shifting mechanism, including a pitman and pitman guide and gate mechanism, governor means for controlling the latter, speed-changing gearing, and means for automatically disconnecting said prime mover from said gearing upon and during the gear shifting actuation of the latter by said speed-responsive gear shifting mechanism.

8. In an automobile, a propelling shaft, a speed-changing gearing, a motor and clutch attached to the latter, speed-responsive mechanism, including pitman and governor controlled pitman guiding means operatively connected to said shaft and gearing adapted to automatically shift the latter at predetermined speeds of said propelling shaft, and means for automatically releasing said clutch during the shifting of said gearing.

9. In an automobile, including driving wheels, and clutch and speed-changing gearing, speed-responsive clutch and gear shifting mechanism mechanically connected to said clutch and speed-changing gearing and the connections between the latter and said driving wheels whereby said speed-changing gearing is automatically shifted and said clutch released at predetermined speeds of said speed-responsive mechanism, said speed-responsive mechanism including a pitman and pitman shifter and controlling means.

10. In an automobile, a traction wheel propelling shaft, gear shifting and governor mechanism connected therewith, said gear shifting mechanism including a pitman and pitman guide and control mechanism, means operated by said governor mechanism for causing said gear shifting and pitman guide control mechanism to be operated by said shaft at predetermined speeds of the latter, and clutch shift mechanism operated and held in released position by said gear shifting mechanism during the gear shifting operation of the latter.

11. In an automatic gear shift for automobiles, an engine shaft, speed-changing gearing, a clutch between the latter and said engine shaft, driving wheels, a driving shaft between the latter and said gearing, speed-responsive mechanism including pitman and pitman guide and control mechanism connected to said driving shaft and said speed-changing gearing and constructed to shift the gears of the latter at predetermined speeds of said driving shaft, and means operated by said speed-responsive mechanism for releasing said clutch during the gear shifting operation of said speed-changing gearing.

12. In an automobile, the combination with the driving wheels, a prime mover, a clutch, speed-changing gearing, and a driving connection between the latter and said driving wheels; of speed-responsive pitman and pitman control mechanism connected to said driving connection and said gearing whereby the latter is operated to change the relative speeds of said prime mover and driving connection at predetermined speeds of said speed-responsive mechanism, and means operated by the latter for releasing said clutch during the speed changing operation of said gearing.

13. In an automatic gear shift for automobiles, a prime mover, speed-changing gearing connected to the latter, a driving shaft leading from said gearing and operatively connected to the driving wheels, a speed-responsive device including a pitman and pitman control mechanism connected to said driving shaft and operatively connected to said gearing whereby the latter is adapted to change the relative speeds of the prime mover and the driving shaft at predetermined speeds of the latter, and clutch and clutch release mechanism operated by said speed responsive device when the latter is shifting said speed changing gearing.

14. In a self-propelled vehicle, a prime mover, speed-changing gearing connecting the latter to the driving wheels of the vehicle, a clutch between said prime mover and gearing, a speed-responsive device, including a pitman and pitman shifter guide and control members, operatively connected to the driving wheels, operative connections between said guide and control members and said gearing whereby the latter is adapted to change the relative speeds of the prime mover and the driving wheels at predetermined speeds of the latter, and means for automatically releasing the clutch between the prime mover and the speed-changing gearing at and during the gear-shifting of the latter by said speed-responsive device.

15. In a self-propelled vehicle, a prime mover, a clutch, speed-changing gearing connected to said clutch, a driving shaft connecting said gearing to the driving wheels of the vehicle, speed-responsive governor-controlled mechanism connected to said shaft and gearing, said mechanism including a pitman and pitman control means together with gear shifter bars adapted to be alternately engaged by said pitman to shift said gearing, whereby the latter is adapted to change the relative speeds of said prime mover and driving shaft at predetermined speeds of the latter, and means for automatically releasing the clutch during the actuation of said speed-changing gearing by said speed-responsive governor-controlled mechanism.

16. In an automatic gear shift for automobiles, a prime mover, speed-changing gearing connecting the latter to the automobile driving wheels, speed-responsive mechanism, said mechanism including a pitman and pitman guiding and controlling means together with gear shifter bars operatively connected to said driving wheels and gearing whereby the latter is controlled and caused by said speed-responsive mechanism to change the relative speeds of said prime mover and driving wheels at predetermined speeds of the latter, and means operated by said speed-responsive mechanism for automatically disconnecting said prime mover and speed-changing gearing while the latter is being actuated by said speed-responsive mechanism.

17. In an automobile, speed-responsive governor controlled gear-shifting mechanism including gear shifter bars, a shifter bar actuating pitman in coöperative relation thereto, and reversing and pitman guiding and controlling mechanism in coöperative relation to said first mentioned mechanism.

18. In an automobile, a prime mover, a traction wheel propelling shaft, speed-responsive clutch and gear shifting mechanism connected therewith, said gear shifting mechanism including gear shifter bars, a pitman adapted to alternately engage the latter, and governor controlled pitman shifting and controlling mechanism, and means for manually controlling and operating said speed-responsive mechanism for reversing said propelling shaft.

19. In an automobile, a prime mover, speed-responsive mechanism including an armed rotatable member speed-changing gearing, shifter bars for the latter, a pitman arranged between and adapted to alternately shift said bars and connected to and reciprocated by said speed-responsive mechanism, and governor and pitman shifter guide and control mechanism in coöperative relation to said speed-responsive mechanism, said governor mechanism including a governor shaft having tripper members adapted to stop and release said armed rotatable member as moved longitudinally.

20. In an automatic gear shift for automobiles, the combination with a prime mover, speed-changing gearing connected to the latter, a driving shaft leading from said gearing, a speed-responsive device connected to said driving shaft, including a reciprocatory slide and a pitman connected to said slide, shifter bars operatively connected to said speed-changing gearing, a pitman shifter guide in coöperative relation to said pitman, clutch and clutch release mechanism operated by said speed-responsive device at and during the gear shifting movements of said slide and pitman, and gate mechanism mounted on said pitman shifter guide in coöperative relation to said pitman and operatively connected to said speed-responsive mechanism.

21. In an automatic gear shift for automobiles, a prime mover, speed-changing gearing, a driving shaft leading from the latter, an arm carrying clutch controlled wheel loosely mounted on said driving shaft and provided with a slide actuating head, reversing mechanism for controlling said clutch controlled wheel, speed-responsive mechanism connected to said shaft and adapted to throw said clutch controlled wheel into and out of engagement with said driving shaft, a slide connected to said slide actuating head and provided with a pitman, a pitman shifter guide, shifter bars operatively connected to said speed-changing gearing and in coöperative relation to said pitman and pitman shifter guide, and gate members connected to said pitman shifter guide and said speed-responsive and reversing mechanism.

22. In an automobile, a propelling shaft, speed-changing gearing, a motor and clutch attached to the latter, speed-responsive mechanism operatively connected to said shaft and gearing, said connection including a clutch carrying wheel loosely mounted on said propelling shaft and provided with a slide actuating head, a slide connected to said actuating head and provided with a pitman, a pitman shifter guide member in coöperative relation to said pitman, shifter bars communicating with said speed changing gearing and adapted to be alternately engaged by said pitman, and means on said pitman shifter guide for controlling said pitman and operatively connected to said speed-changing and speed-responsive mechanism.

23. In an automatic gear shift for automobiles, the combination with a prime mover, speed-changing gearing connected to the latter, a driving shaft leading from said gearing, a speed-responsive device connected to said driving shaft, including a reciprocatory slide and a pitman connected to said slide, means for manually controlling said speed-responsive device, shifter bars operatively connected to said speed-changing gearing, a pitman shifter guide in coöperative relation to said pitman, clutch and clutch release mechanism operated by and held in a released position by said speed-responsive device at and during the gear shifting movements of said slide and pitman, and gate members mounted in said pitman shifter guide in coöperative relation to said pitman and operatively connected to said speed-responsive and manual control mechanism.

24. In an automatic gear shift for automobiles, a prime mover, speed-changing gearing, a driving shaft leading from the latter, a slide actuating member rotatably mounted on said driving shaft, speed-responsive mechanism connected to said shaft and adapted to throw said slide actuating member into and out of engagement with said driving shaft, a slide connected to said slide actuating member and provided with a bar shifting pitman, an H-shaped pitman shifter guide, shifter bars operatively connected to said speed shifting gearing and gate mechanism on said pitman shifter guide and connected to said speed-responsive mechanism.

25. In an automobile, a propelling shaft, speed-changing gearing, a motor and clutch attached to the latter, speed-responsive mechanism operatively connected to said shaft and gearing, said speed-responsive mechanism including a clutch controlled member loosely mounted on said propelling shaft and provided with a slide actuating head, a slide provided with a pitman, a pitman shifter including side and intermediate guide members in coöperative relation to said pitman, shifter bars communicating with said speed-changing gearing and adapted to be alternately engaged by said pitman, and means connected with said pitman shifter guide members for controlling said pitman therein and operatively connected to said speed-changing and speed-responsive mechanism.

In testimony whereof I have affixed my signature in the presence of two witnesses.

EDWIN L. MILLER.

Witnesses:
R. B. PUTNAM,
CARL SCHULTZ.